United States Patent [19]
Morris et al.

[11] 3,906,362
[45] Sept. 16, 1975

[54] CHART ADAPTER FOR USE IN RECORDING OSCILLOSCOPE DATA

[75] Inventors: Richard H. Morris, Tampa; Harry F. Strenglein, Clearwater, both of Fla.

[73] Assignee: Sperry Rand Corporation, New York, N.Y.

[22] Filed: Sept. 3, 1974

[21] Appl. No.: 502,600

[52] U.S. Cl............ 324/113; 324/121 R; 340/324 A
[51] Int. Cl.²................. G01R 13/04; G01R 13/20; G01R 13/30
[58] Field of Search .......... 324/113, 121; 343/17.7, 343/5 PC; 340/324 A; 315/393

[56] References Cited
UNITED STATES PATENTS

| | | |
|---|---|---|
| 3,404,309 | 10/1968 | Massell et al. ............... 340/324 A |
| 3,500,115 | 3/1970 | Auger, Jr. ...................... 340/324 A |
| 3,577,031 | 5/1971 | Welsh et al. .................. 340/324 A |

*Primary Examiner*—Alfred E. Smith
*Assistant Examiner*—Ernest F. Karlsen
*Attorney, Agent, or Firm*—Howard P. Terry; Joseph M. Roehl

[57] ABSTRACT

An adapter for operating an X–Y plotter such as a chart recorder in response to oscilloscope data includes a function generator for electronically generating a graticule which may be displayed on the cathode ray tube and means for generating corresponding auxiliary sweeps for the chart recorder at each voltage level generated by the function generator. Since the graticule information and auxiliary sweep information passes through the same deflection circuitry as the signal, the linearity and drift errors are substantially cancelled.

10 Claims, 3 Drawing Figures

3,906,362

CHART ADAPTER FOR USE IN RECORDING OSCILLOSCOPE DATA

BACKGROUND OF THE INVENTION

1. Field of the Invention

This invention relates to electrical measuring apparatus and more specifically to apparatus useful in making a permanent record of oscilloscopic data.

2. Description of the Prior Art

Adapters for operating an X-Y plotter in response to oscilloscope data are known in the art. If a calibrated scale is desired with such apparatus, either a set of horizontal traces must be generated or graph paper must be used on the recorder. In either case, errors can occur because the linearity of the oscilloscope deflection system is different from that of the plotter. In situations where graph paper is used on the plotter, careful adjustment to assure equality of the oscilloscope graticule and the graph paper spacing is required.

SUMMARY OF THE INVENTION

The present invention overcomes difficulties of prior art devices by providing means for internally generating calibration signals which may be displayed on an oscilloscope tube and on an X-Y plotter during the retrace time of the primary sweep functions.

DESCRIPTION OF THE PREFERRED EMBODIMENT

Figure 1A:
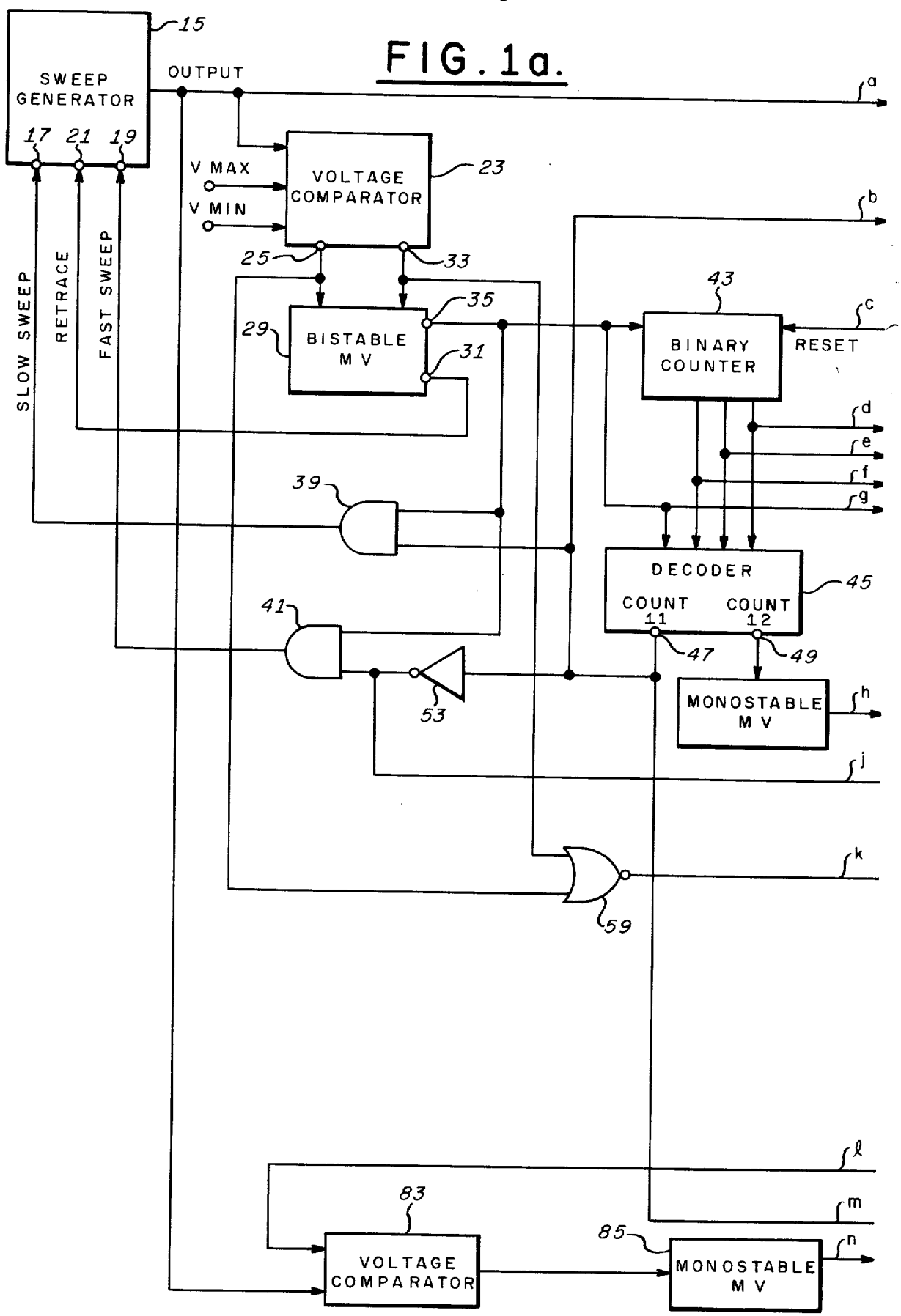
FIG. 1 is a diagram, partly in block form, illustrating a circuit useful in practicing the invention.
Figure 1B:
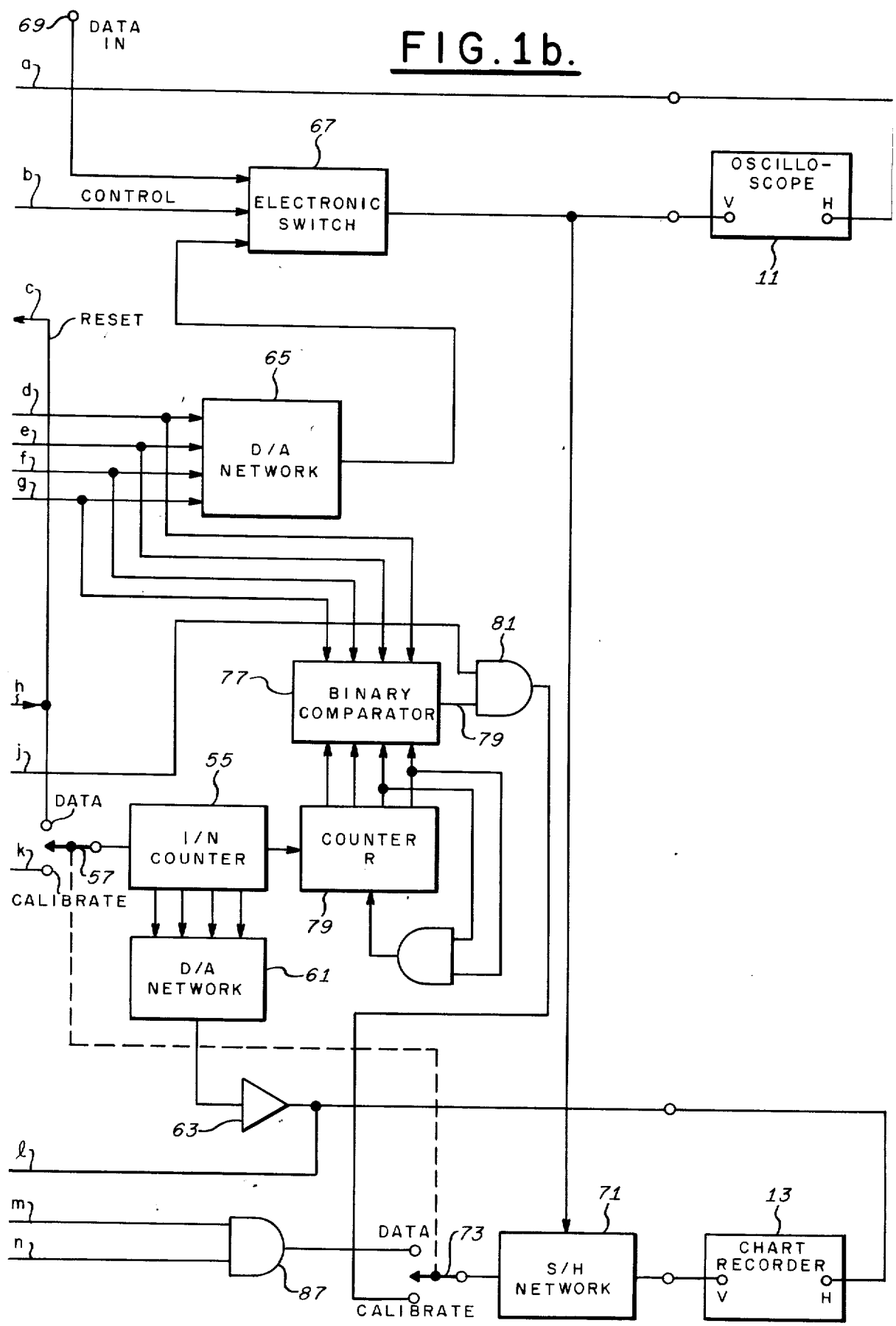

FIG. 1 illustrates a circuit for displaying information on an oscilloscope 11 and recording the same information on a mechanically actuated X-Y plotter, which has been illustrated as a chart recorder 13. In accordance with the usual practice, the information to be displayed and recorded is applied to the vertical input terminals V of the oscilloscope and chart recorder respectively, whereas appropriate sweep voltages are applied to the horizontal terminals H of the same instruments.

A sweep generator 15 is of straightforward design, but includes means for providing a relatively slow sweep output signal in response to a "slow" sweep command signal applied to an input terminal 17 or a relatively fast output sweep signal in response to a "fast" sweep command signal applied to its input terminal 19. In either case, the output sweep voltage is returned to the zero level in response to a "retrace" command signal applied to an input terminal 21.

As will become evident from the description, the circuit of the invention employs an operating cycle consisting of alternate "calibration" and "data" phases. The fast sweep rate is used during the calibration phase, and the normal sweep rate is used during the data phase of the operating cycle as illustrated in the "horizontal" curve of FIG. 2.

The output voltage of the sweep generator 15 is compared with reference voltages $V_{max}$ and $V_{min}$ in a voltage comparator 23. When the sweep voltage exceeds the $V_{max}$ reference, the voltage comparator produces an output voltage at its terminal 25. This voltage triggers a bistable multivibrator 29 so as to produce a retrace command signal at terminal 31 of the multivibrator.

When the output voltage from the sweep generator 15 subsequently drops below the $V_{min}$ reference level, the voltage comparator 23 produces an output signal on its terminal 33 which switches the multivibrator 29 so that it then produces an output signal at its terminal 35. Output signals from the terminal 35 constitute primary sweep command signals which are used to enable AND gates 39 and 41 so as to initiate an appropriate sweep voltage.

The output signal from the terminal 35 of the multivibrator 29 is also applied to a binary counter 43. The output of the binary counter is applied to a straightforward decoder circuit 45 which is arranged to produce a first output pulse at its terminal 47 in response to the $11^{th}$ pulse applied to the counter 43 and a second output pulse at its terminal 49 in response to the $12^{th}$ pulse applied to the counter 43. A pulse appearing on the terminal 49 is applied to a monostable multivibrator 51 whose output is used to reset the binary counter 43.

The output pulse appearing on the terminal 47 of the decoder 45 is applied directly to the AND gate 39 and through an inverter 53 to the AND gate 41.

Figure 2:
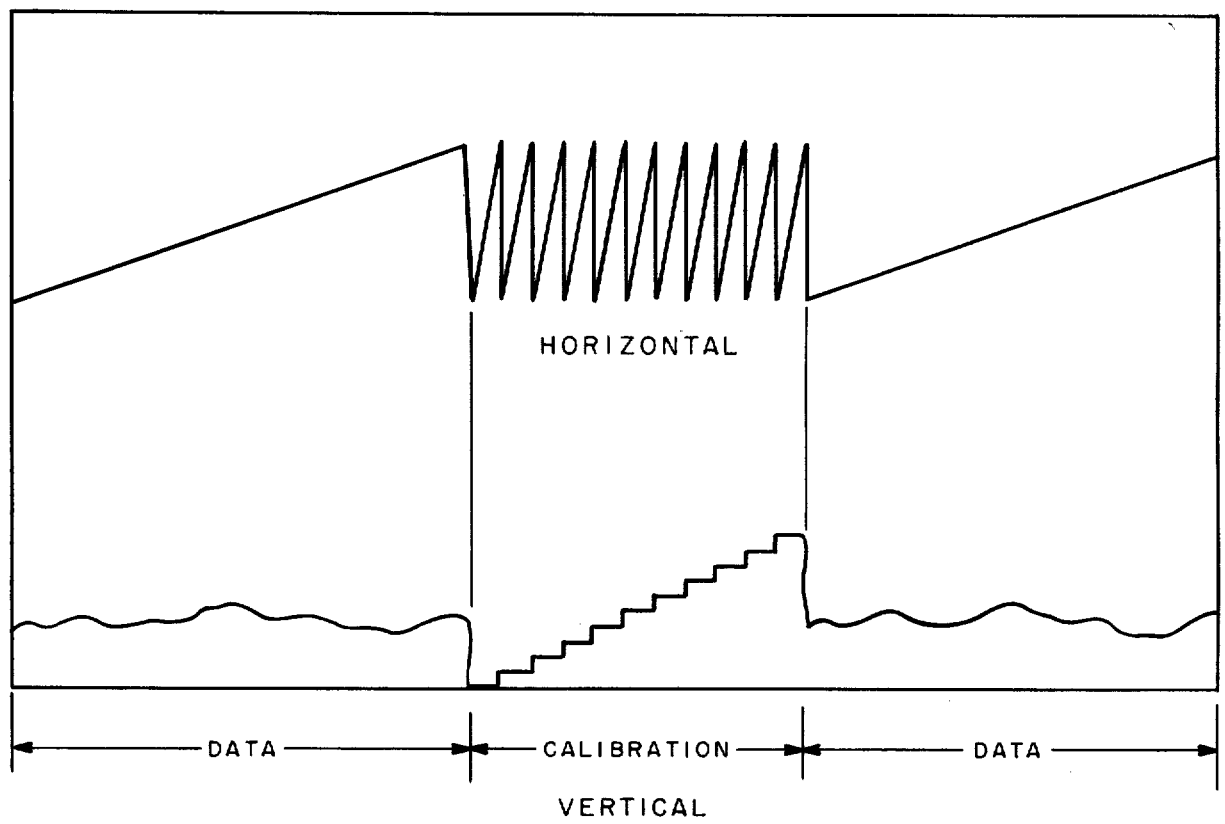
FIG. 2 is a graphical representation of deflection voltages useful in explaining the operation of the circuit of FIG. 1.

To understand the operation of this portion of the circuit, assume that operation is commenced at the beginning of a calibration phase of the operating cycle with the output of the sweep generator at zero voltage level as depicted in FIG. 2. Since the output sweep voltage is below the $V_{min}$ reference, the voltage comparator 23 produces an output signal at its terminal 33 so as to provide a primary sweep command signal at the terminal 35 of the multivibrator 29. This latter signal will be applied to the AND gates 39 and 41 and to the binary counter 43. Since this signal will be the first in a series applied to the binary counter 43, the decoder 45 will produce a low level signal at its terminals 47 and 49. The low level signal at terminal 47 will hold gate 39 closed. However, since this signal is inverted in the inverter 53, the gate 41 will be opened, a fast sweep command signal will be applied to the generator 15, and a fast sweep will be initiated.

The resulting fast sweep signal from the AND gate 41 will cause the sweep output voltage to rise until it exceeds the $V_{max}$ reference whereupon the multivibrator 29 will be switched so as to produce a retrace signal as indicated in FIG. 2. The operation will continue in a cyclical nature throughout the calibration phase until the counter 43 detects the $11^{th}$ pulse whereupon a high level signal will appear at the terminal 47 of the decoder 45 so as to close the AND gate 41 and open the AND gate 39 and initiate a slow-sweep voltage pulse. At this point, the circuit has entered the data phase of its operating cycle wherein the sweep voltage rises at a relatively slow rate.

When the slow-sweep output voltage exceeds the $V_{max}$ reference, a $12^{th}$ pulse will be applied to the binary counter so that the decoder 45 will produce a high level signal at its terminal 49 and reset the counter. At the same time, the terminal 47 of the decoder 45 will return to a low voltage level so as to close the gate 39 and open the gate 41 and thus produce a fast sweep command signal which will initiate a new calibration cycle.

The sweep signals are applied directly to the oscilloscope 11. However, auxiliary circuits are used to actuate the sweep circuit of the chart recorder 13.

Since the sweep for the chart recorder is necessarily slower than that for the oscilloscope, the repetition rate of the sweep signals is effectively reduced in a frequency dividing counter 55. Typically, an 8-stage counter may be used to divide the sweep rate by 256. Input signals to the counter 55 are supplied through a selector switch 57 so that the counter may be selected to receive output signals from the monostable multivibrator 51 when data is to be recorded, or from a NOR gate 59 when a calibrated scale is to be recorded. The NOR gate 59 is connected to receive pulses from terminals 25 and 33 of the voltage comparator 23.

The output of the counter 55 is applied to a conventional digital/analog network 61 such as a ladder network which produces a step-like d.c. output voltage having a magnitude which increases in accordance with the increase in binary value of the signals applied from the counter 55 and automatically returns to zero level when the counter recycles. The signal from the network 61 is passed through an amplifier 63 and applied to the horizontal input terminal of the chart recorder. Thus, the slow sweep for the chart recorder occurs in a step-wise fashion at a rate acceptable to the recorder.

During calibration, the vertical deflection voltage for the oscilloscope is derived in a second digital/analog network 65 from the output of the binary counter 43. The network 65 typically is a conventional ladder network which produces a step-like voltage as pictured in FIG. 2 in response to the triangular calibration sweep voltages. The output of the digital/analog network 65 is applied to the vertical input terminal of the oscilloscope through an electronic switch 67. The electronic switch is arranged so that the output of the network 65 is applied to the oscilloscope unless a high level control signal is applied to its control terminal from the output terminal 47 of the decoder 45.

During the calibration phase of the operating cycle, it will be remembered that the output voltage on the terminal 47 of the decoder 45 remains at a low level until a count of 11 appears at the output of the counter 43. Thus during the calibration cycle, successively higher voltages are applied to the vertical terminal of the oscilloscope in synchronism with successive sweep voltages so that a series of parallel horizontal lines are generated on the face of the oscilloscope spaced at intervals representing known increments in voltage as determined by the output of the network 65.

At the end of the calibration phase, the voltage on the terminal 47 of the decoder 45 rises to a high level, which actuates the electronic switch 67 and permits data input voltage from the terminal 69 to be applied to the vertical input of the oscilloscope. At the same time, the normal or data sweep voltage is being applied to the horizontal terminal of the oscilloscope.

Vertical deflection voltages for the chart recorder 13 are derived from the electronic switch 67 through a conventional sample/hold network 71 in response to timing pulses applied to the selector switch 73 which is ganged with the selector switch 57 previously described. The timing pulse from the switch 73 actuates the sample/hold network which serves to hold the value of the signal received from the electronic switch 67 at that instant in time. When the chart recorder is to be calibrated, the switches 57 and 73 are closed in the CALIBRATE position. The counter 55 receives pulses from the voltage comparator 23 through the NOR gate 59. The counter 55 responds to only positive-going pulses so that the counter is advanced one count for each excursion of the sweep voltage from the generator 15. The last stage in the counter 55 is coupled to a second counter 75. Effectively, the counter 75 is advanced one count at the end of each horizontal sweep of the chart recorder.

The output of the counter 75 is applied to a binary comparator 77 which is also coupled to the output of the binary counter 43. The binary comparator produces an output signal at its terminal 79 whenever the counters 43 and 75 agree. The binary comparator 77 is a conventional device and may, for instance, be a commercially available 4-bit exclusive OR integrated circuit such as the RCA CD4030. The output of the comparator is applied to an AND gate 81 which is enabled in response to the output of the inverting amplifier 53. Since the inverting amplifier 53 is actuated from the terminal 47 of the decoder 45, the AND gate 81 is enabled except when the decoder 45 detects a count of 11 in the binary counter 43. Effectively then, the AND gate 81 is enabled only during the CALIBRATE phase of the operating cycle.

The output of the AND gate 81 is applied to the CALIBRATE terminal of the switch 73 so that it can be used to sample the output of the electronic switch at appropriate times when the recorder 13 is being calibrated.

The counter 75 is supplied with a conventional automatic reset circuit which resets the counter to zero each time that the counter has been advanced to a count of 12.

When a graticule is to be printed on the recorder, the counter 55 acting through the digital/analog network 61 will produce a first step-wise sweep voltage as discussed previously. During this first sweep excursion, the counter 75 will remain in the ZERO state. The binary comparator will be able to produce an output voltage each time that the counter 43 is reset to zero. However, at this time, the output of the digital/analog network is zero so that the sample/hold network 71 provides zero voltage to the vertical input terminal of the recorder 13.

At the end of the first sweep, the counter 55 will advance the counter 75 to a count of 1 and the binary comparator 77 will produce an output voltage each time that the counter 43 produces an output voltage each time that the counter 43 produces an output count of 1. At such times, the digital/analog network 65 will produce an analog voltage having a magnitude of one unit which will be applied through the electronic switch 67 to the sample/hold network 71 so as to apply a corresponding voltage to the vertical input terminal of the recorder 13 each time that the counter 43 produces an output count of 1. Under such conditions a second horizontal line of the graticule will be printed on the recorder 13 at a level representative of one unit.

Successive sweeps on the chart recorder will continue to print the graticule until the decoder 45 reaches a count of 11, whereupon the gate 81 will be disabled and the data input signal, which passes through the electronic switch 67 during the data phase of the operating cycle, cannot be applied to the chart recorder.

When data is to be recorded on the recorder 13, the switches 57 and 73 are placed in the DATA position. Under these conditions, the sample/hold network 71 is actuated through a voltage comparator 83, a monostable multivibrator 85, and an AND gate 87.

The AND gate 87 is enabled in response to a high level voltage at the output terminal 47 of the decoder 45, which occurs only when the decoder 45 sense a count of 11. Thus the AND gate 87 is enabled only during the DATA phase of the operating cycle.

The voltage comparator 83 receives a first signal corresponding to the sweep voltage applied to the chart recorder 13 at the output of the amplifier 63, and a second signal corresponding to the sweep voltage applied to the oscilloscope 11 from the sweep generator 15. The voltage comparator 83 is constructed to produce an output voltage each time that the oscilloscope sweep voltage exceeds the recorder sweep voltage. The output of the voltage comparator triggers the monostable multivibrator 85 which, in turn, produces an output pulse suitable for actuating the sample/hold network 71 when applied to the DATA terminal of the switch 73.

Thus, during the DATA phase of the operating cycle, the data input signal from the electronic switch 67 is applied to the vertical input terminal of the recorder 13.

It will be noticed that when data is being recorded, the sweep is advanced step-wise each time that the counter 43 is reset to zero. Similarly, the data input signal is sampled by the electronic switch 67 each time that the binary counter 43 reaches a count of 11. Thus the vertical displacement of the recorder is updated for each increment of horizontal sweep voltage.

It will be appreciated that references to vertical and horizontal voltages applied to the oscilloscope 11 and the recorder 13 are for purposes of illustration only. The signal and sweep terminals may be selected as desired.

It will further be appreciated that although a chart recorder has been described as the recording element, any suitable type of X-Y plotter may be used for this purpose.

Furthermore, it will be appreciated by those skilled in the art that though a particular operating cycle has been described in which eleven calibration traces alternate with a single data trace, variations of this operating cycle may be used where desired. Thus, in some instances, it may be preferred to employ an operating cycle in which uniform sweep cycles are employed and alternate cycles are used for sampling data and for calibration purposes.

By using the principles of the present invention, linearity and drift of the oscilloscope tube and deflection circuit is substantially cancelled since the graticule is generated through the deflection circuits. Since the same function generator is used for producing calibration voltages for the recorder, the recorder is also calibrated automatically. In addition, unlined paper can be used on the recorder and the scale need not be equally spaced. Set up time is reduced to a minimum since deflection circuits need not be adjusted to conform to spacings on pre-printed draft paper.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. Apparatus for simultaneously displaying and recording information on an oscilloscope and on an X-Y plotter respectively, said oscilloscope and said plotter each having signal and sweep input terminals, said apparatus including:

sweep generating means for generating relatively slow or relatively fast oscilloscope sweep voltage pulses in response to slow and fast sweep command signals, respectively, means for producing alternately, a group of consecutive fast sweep command signals and a single slow sweep command signal, means including resettable counter means for producing a first step-like oscilloscope deflection voltage that increases in magnitude with each of said fast sweep command signals in a given group, means for switching said first step-like voltage to the signal deflection terminal of an oscilloscope during the occurrence of said fast sweep voltages and an externally generated data input signal to the same terminal during the occurrence of a slow sweep command signal, dual position selection means for operating said plotter in either a DATA or a CALIBRATE mode, means including recycling counter means for producing step-like plotter sweep voltages having a magnitude indicative of the binary state of the recycling counter means, means for advancing said recycling counter after the completion of each slow sweep command signal when the selection means is in the DATA position, and after the completion of each oscilloscope sweep voltage pulse when the selection means is in the CALIBRATE position, additional counter means for counting the number of times said recycling counter is advanced to its maximum possible count, means for producing a comparator signal whenever the binary states of said resettable counting means and said additional counting means are equal, means for producing a CALIBRATE sampling signal whenever a comparator signal occurs during the time that a group of fast sweep command signals is being produced, means for producing a DATA sampling signal whenever the magnitude of one of said relatively slow oscilloscope sweep voltage pulses exceeds the magnitude of said plotter sweep voltage, and means for applying a voltage equal to the output of said switching means to the signal input terminal of a plotter in response to a DATA sampling signal or a CALIBRATE sampling signal when the selection means is in the DATA or CALIBRATE positions, respectively.

2. The apparatus of claim 1 wherein the means for producing sweep command signals includes means for producing a primary sweep command signal when the oscilloscope sweep voltage falls below a first reference and means for producing a retrace signal when the oscilloscope sweep voltage exceeds a second reference.

3. The apparatus of claim 2 wherein said sweep command signal producing means includes means for advancing said resettable counter means in response to a primary sweep command signal, and wherein said sweep command signal producing means further includes means for producing a fast sweep command signal when the count in said resettable counter means remains below a predetermined value and a slow sweep command signal when the count is equal to said predetermined value.

4. The apparatus of claim 3 wherein the means for producing fast and slow sweep command signals includes decoder means having a first output terminal connected to provide a high level output signal only when the resettable counter has been advanced to said predetermined value and first and second gating means connected to be enabled and disabled respectively by said high level output signal, each of said gating means being further connected to receive said primary sweep command signals, the output of said first and second gating means being coupled to said sweep generating means so as to provide slow and fast sweep command signals, respectively, to the sweep generating means.

5. The apparatus of claim 4 further characterized in that the decoder means also includes a second output terminal connected to provide a high level output signal only when the resettable counter has been advanced one count beyond said predetermined value, said second output terminal being coupled to the resettable counter so as to reset that counter to the zero binary state in response to said high level output signal.

6. The apparatus of claim 1 wherein the individual stages of said recycling counter means are coupled to a digital/analog network for providing said step-like plotter sweep voltages to an external plotter, and the highest-valued stage of said recycling counter is coupled to the input of said additional counter so as to actuate this additional counter each time that the recycling counter is filled.

7. The apparatus of claim 6 wherein the means for producing the slow sweep command signal includes a decoder means coupled to receive binary output signals from said resettable counter means and arranged to provide a high level output signal when the counter has been switched to a predetermined binary state by a command signal corresponding to the final fast sweep command signal in a given group, said means for producing a CALIBRATE sampling signal further including AND gating means connected to couple CALIBRATE signals to said selection means in response to output signals from said comparator signal producing means except when inhibited by a high level output signal from said decoder means.

8. The apparatus of claim 7 wherein the means for producing a DATA sampling signal includes voltage comparator means coupled to receive oscilloscope and plotter sweep voltages and arranged to produce an output signal when the oscilloscope sweep voltage exceeds the plotter sweep voltage, said DATA sampling signal means further including AND gating means responsive to output signals from said voltage comparator means and to high level output signals from said decoder means so as to produce a DATA sampling signal whenever the oscilloscope sweep voltage exceeds the plotter sweep voltage during the occurrence of a slow oscilloscope sweep voltage pulse.

9. The apparatus of claim 8 wherein the means for applying a voltage equal to the output of said switching means to the signal input of a plotter includes a sample/hold network further being coupled to receive DATA or CALIBRATE sampling signals through said selection means, said sample/hold network further being coupled to receive output signals from said switching means and arranged to provide voltages equal to the output signals from the switching means to the signal input terminal of an external plotter in response to DATA or CALIBRATE sampling signals as selected by the selection means.

10. Apparatus for simultaneously displaying and recording information on an oscilloscope and on an X-Y plotter respectively, said oscilloscope and said plotter each having signal and sweep input terminals, said apparatus including:

sweep generating means for generating relatively slow and fast oscilloscope sweep voltages in response to normal and fast sweep command signals, respectively, means for producing a sweep command signal when the oscilloscope sweep voltage falls below a specified minimum value and retrace command signal when the oscilloscope sweep voltage exceeds a specified maximum value, first counting means for counting the number of times that the oscilloscope sweep voltage falls below said specified minimum value, means in said sweep command signal producing means for producing a fast sweep command signal when the count in said counting means is less than a predetermined value and for producing a normal sweep command signal when the count is equal to said predetermined value, means for resetting said counter means when the counter is advanced beyond said predetermined value, digital/analog means for providing a dc voltage having a magnitude indicative of the count in said counter, switching means for applying the output of said digital/analog means to the signal input terminal of the oscilloscope when the counter is below said predetermined value and for applying data input signals to the same terminal when the counter is at said predetermined value, selection means for optionally operating said plotter in either a CALIBRATE or a DATA mode, means for applying incremental sweep voltages to said plotter in response to each oscilloscope sweep pulse when the plotter is in the CALIBRATE mode and in response to said counter re-setting means when the plotter is in the DATA mode, second counter means for determining the number of complete sweep cycles applied to the plotter during the CALIBRATE mode, means to provide a CALIBRATE switching signal when said first and second counters agree and the count in said first counting means is below said predetermined value, means to provide a DATA switching signal when the oscilloscope sweep voltage exceeds the plotter sweep voltage and said first counting means is at said predetermined value, and sample/holding means for applying the output voltage from said switching means to the signal input terminal in response to either a CALIBRATE switching signal or a DATA switching signal.

* * * * *